United States Patent
Rabaut et al.

(10) Patent No.: US 12,221,324 B2
(45) Date of Patent: Feb. 11, 2025

(54) METHOD AND HOISTING YOKE FOR TAKING UP AN ELONGATE OBJECT

(71) Applicant: DEME Offshore BE NV, Zwijndrecht (BE)

(72) Inventors: Dieter Wim Jan Rabaut, Ghent (BE); Jan Maria Koen Michielsen, Antwerp (BE); Kenneth Gerard Vannieuwenhuyse, Sint-Amandsberg (BE); Robin Mouwen, Merksem (BE)

(73) Assignee: DEME Offshore BE NV, Zwijndrecht (BE)

( * ) Notice: Subject to any disclaimer, the term of this patent is extended or adjusted under 35 U.S.C. 154(b) by 168 days.

(21) Appl. No.: 17/797,746

(22) PCT Filed: Feb. 8, 2021

(86) PCT No.: PCT/EP2021/052969
§ 371 (c)(1),
(2) Date: Aug. 5, 2022

(87) PCT Pub. No.: WO2021/156508
PCT Pub. Date: Aug. 12, 2021

(65) Prior Publication Data
US 2023/0070015 A1 Mar. 9, 2023

(30) Foreign Application Priority Data
Feb. 6, 2020 (BE) .................................. 2020/5071

(51) Int. Cl.
*B66C 1/10* (2006.01)
*B66C 1/16* (2006.01)
*F03D 13/10* (2016.01)

(52) U.S. Cl.
CPC ................ *B66C 1/108* (2013.01); *B66C 1/16* (2013.01); *F03D 13/10* (2016.05); *F05B 2230/61* (2013.01)

(58) Field of Classification Search
CPC . B66C 1/108; B66C 1/16; F03D 13/10; F05B 2230/61; Y02E 10/727; Y02E 10/72; Y02P 70/50
See application file for complete search history.

(56) References Cited

U.S. PATENT DOCUMENTS

2018/0195497 A1  7/2018  Neumann

FOREIGN PATENT DOCUMENTS

| CN | 105649893 | * 6/2016 | ............. F03D 13/10 |
| DE | 102019109204 A1 | 10/2019 | |

(Continued)

*Primary Examiner* — Lynn E Schwenning
(74) *Attorney, Agent, or Firm* — The Webb Law Firm

(57) ABSTRACT

Described is a method for taking up an elongate object from a ground surface using a hoisting yoke coupled to a lifting means. A beam-like support frame of the hoisting yoke extends in a longitudinal direction of the object and slings provided at end parts of the support frame take up the object. The object is taken up in a sling by holding a first outer end of a sling with a first holding means provided at an end part of the support frame and letting it hang down from the first holding means to a position in the vicinity of the object; paying out a messenger line from the end part using a messenger line winch, feeding it under the object and coupling it to a second outer end of the sling hanging from the first holding means; taking in the messenger line so that the sling is carried under the object and to the relevant end part; and coupling the second outer end of the sling to a second holding means provided at the end part, thus forming one of the slings for the object.

6 Claims, 7 Drawing Sheets

(56) References Cited

FOREIGN PATENT DOCUMENTS

| JP | S5320776 A | 2/1978 | | |
|---|---|---|---|---|
| KR | 1020120122630 A | 11/2012 | | |
| WO | 9745360 A2 | 12/1997 | | |
| WO | 2011050999 A1 | 5/2011 | | |
| WO | WO 2020/020744 | * | 1/2020 | ............. B66C 23/52 |

* cited by examiner

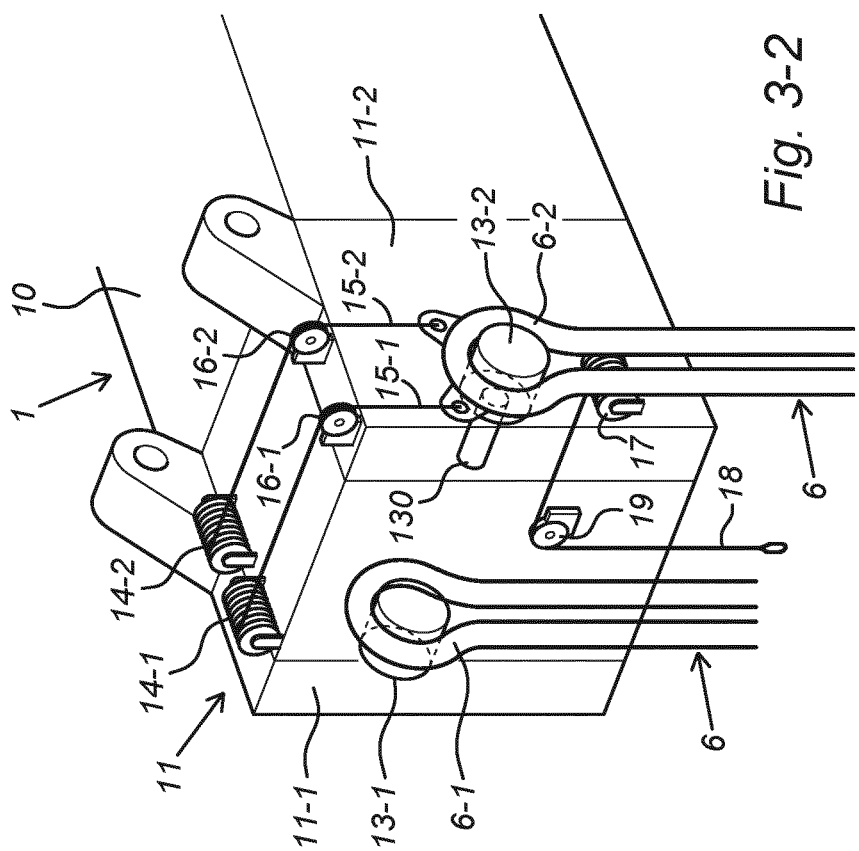
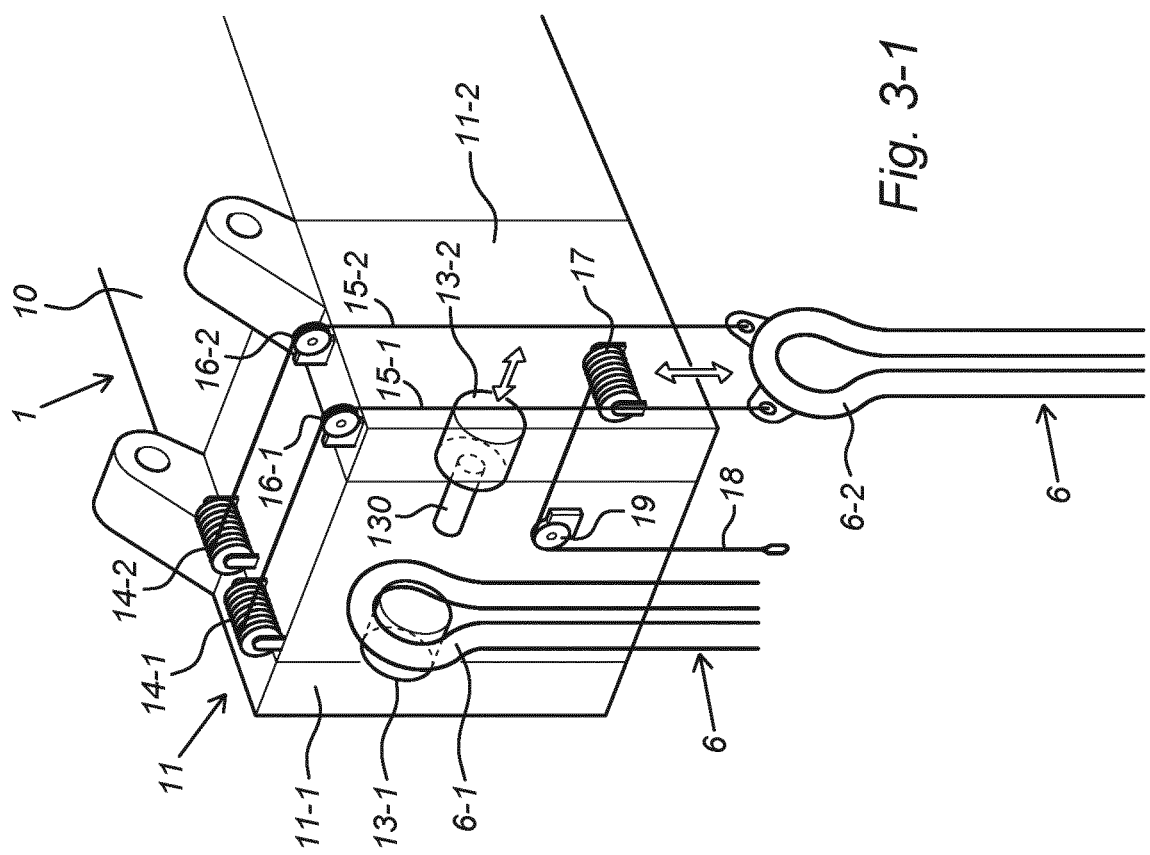

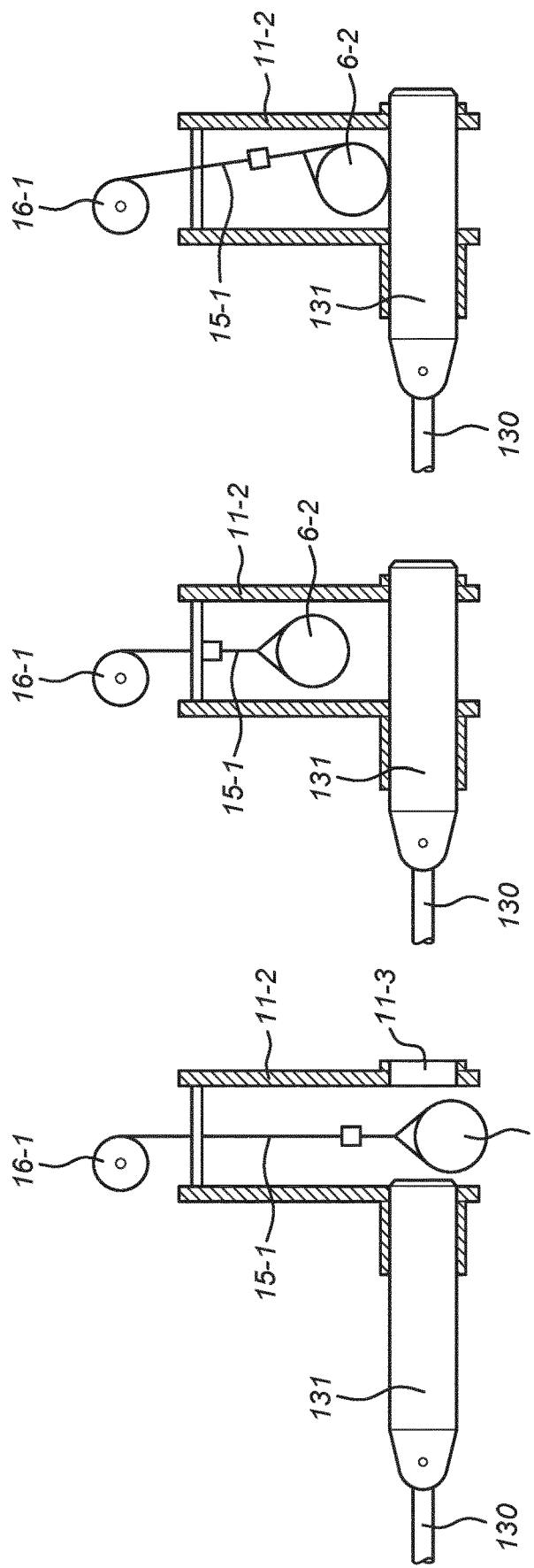

METHOD AND HOISTING YOKE FOR TAKING UP AN ELONGATE OBJECT

CROSS-REFERENCE TO RELATED APPLICATIONS

This application is the United States national phase of International Application No. PCT/EP2021/052969 filed Feb. 8, 2021, and claims priority to Belgian Patent Application No. 2020/5071 filed Feb. 6, 2020, the disclosures of which are hereby incorporated by reference in their entirety.

BACKGROUND OF THE INVENTION

Field of the Invention

The invention relates to a method for taking up an elongate object from a ground surface using a hoisting yoke coupled to a lifting means, wherein a support frame of the hoisting yoke extends in a longitudinal direction of the object, and wherein slings provided at end parts of the support frame take up the object. The invention likewise relates to a hoisting yoke which is applied in the method, a lifting crane provided with the hoisting yoke, and a vessel which is provided with the lifting crane.

Description of Related Art

The invention will be elucidated with reference to the placing of (components of) an offshore wind turbine. This reference does not however imply that the invention is limited thereto, and the method and corresponding hoisting yoke can be applied equally well for lifting and placing any other structure. It is thus for instance possible to apply the invention in the context of the hoisting of components for other offshore foundation structures, such as jetties, radar and other towers, and also for onshore applications.

When placing a component of a wind turbine, such as a foundation pile, on an underwater bottom, the foundation pile is taken up from a vessel with a lifting crane. For the purpose of taking up such a foundation pile a lifting tool, such as for instance a sling or a hoisting yoke, is attached to the foundation pile. For the purpose of the lifting such a hoisting yoke is connected to a load hook of a lifting crane. The foundation pile taken up in this manner can then be brought into vertical position and lowered onto or into the underwater bottom using an upending tool or other tool, after which the foundation pile is uncoupled from the lifting crane.

According to the prior art, the elongate object to be lifted is connected to the hoisting yoke manually. The object is thus arranged in the slings largely manually. Elongate objects to be taken up, such as the above stated foundation pile, are however becoming increasingly heavier and larger, whereby it is no longer safe to carry out the above stated operations substantially manually. Swinging movements of the lifting tool induced by wave and wind action can moreover result in even more unsafe situations for the deck crew, and possibly also in damage to the object.

There is therefore a need for supporting sling hoists, auxiliary cranes, forklifts or similar auxiliary devices for making the lifting tool, such as a hoisting yoke, manageable so as to be able to arrange an object therein. The space available on a work deck of an installation vessel is often already taken up by objects to be transported, making it difficult to apply these auxiliary devices.

SUMMARY OF THE INVENTION

An object of the present invention is therefore to provide a method for taking up an elongate object from a ground surface using a hoisting yoke coupled to a lifting means, wherein the above stated drawbacks and risks are at least partially obviated.

According to the invention, a method is provided for this purpose. The method for taking up an elongate object from a ground surface using a hoisting yoke coupled to a lifting means, wherein a support frame of the hoisting yoke extends in a longitudinal direction of the object and wherein slings provided at end parts of the support frame take up the object, is characterized in that the object is taken up in a sling by:
  a) holding a first outer end of a sling with a first holding means provided at an end part of the support frame and letting it hang down from the first holding means to a position in the vicinity of the object,
  b) paying out a messenger line from the end part using a messenger line winch, feeding it under the object and coupling it to a second outer end of the sling hanging from the first holding means,
  c) take in the messenger line so that the sling is carried under the object and to the relevant end part,
  d) coupling the second outer end of the sling to a second holding means provided at the end part, thus forming one of the slings for the object.

The invented method requires less human input in principle, at least not at the position of the work deck, where the risks of unexpected movements can arise. The method is therefore intrinsically safe, and can moreover be applied in bad weather. Less time is hereby lost waiting for acceptable weather conditions.

The support beam of the support frame can be elongate, and for instance take a beam-like form. It is also possible for the support frame to take a cylindrical form.

An embodiment of the device according to the invention is characterized in that the steps a)-d) are performed at both end parts of the support frame. Particularly efficient is an embodiment wherein the steps a)-d) are performed simultaneously at both end parts of the support frame.

Another embodiment comprises a method wherein an auxiliary line is payed out from the end part using an auxiliary line winch and, prior to step a), is coupled to the second outer end of the sling hanging from the first holding means, step a) is performed, and the auxiliary line is uncoupled from the second outer end prior to step b).

Yet another embodiment is aimed at a method wherein the sling is lowered on one side of the object in step a) and the messenger line is lowered on another side of the object in step b).

A further embodiment comprises a method wherein the messenger line is fed under the object in step b) by coupling it to an outer end of a connecting line provided under the object.

In yet another embodiment the method has the feature that another outer end of the connecting line is coupled to the second outer end of the sling hanging from the first holding means.

The method can in principle be applied to take up an elongate object from any ground surface suitable therefor. An embodiment wherein the advantages of the method become particularly manifest is characterized in that the ground surface comprises a work deck of an optionally floating vessel. The invented method is also advantageously applied in an embodiment of the method wherein the elongate object comprises a wind turbine or a component thereof, or a foundation pile for a wind turbine. In addition, the method is also suitable for other applications, for instance in the context of oil and gas platform installations or in the context of decommissioning such platforms.

Another aspect of the invention relates to a hoisting yoke for an elongate object, which is suitable for application in the invented method. The hoisting yoke comprises a support frame which is configured to extend in a longitudinal direction of the object and to be coupled to a lifting means, and which is provided at end parts with slings for taking up the object, wherein each end part of the support frame comprises a first holding means for a first outer end of a sling and a second holding means for a second outer end of the sling, and further a messenger line winch which is configured to pay out a messenger line and to couple it to the second outer end of the sling hanging from the first holding means, this such that when the messenger line is taken in, said sling is carried under the object and to the relevant end part until the second outer end is in a position in which the second outer end can be coupled to the second holding means, thus forming one of the slings for the object when coupled.

A further improved hoisting yoke according to an embodiment of the invention is characterized in that each end part of the support frame further comprises an auxiliary line winch configured to pay out an auxiliary line from the end part.

The messenger line winch and/or the optional auxiliary line winch can in principle be configured and driven in any manner known to the skilled person. In a practical embodiment of the invention the hoisting yoke comprises at least one drive, particularly an electric and/or hydraulic drive, for driving the messenger line winch and/or the optional auxiliary line winch.

The ease of operation is further increased in an embodiment wherein the hoisting yoke is provided with a drive which can be controlled remotely.

An embodiment of the hoisting yoke wherein the messenger line winch and/or the optional auxiliary line winch are releasably connected to the hoisting yoke provides a versatile solution.

The invented hoisting yoke can advantageously be connected to the hoisting cables of a lifting crane in known manner. With a lifting crane provided with the invented hoisting yoke any elongate object can in principle be taken up in safe manner, wherein the above outlined advantages for the attachment of the object to the hoisting yoke may occur at least partially.

Any type of lifting crane can in principle be provided with the hoisting yoke according to the invention. The advantages of the hoisting yoke however become particularly manifest when the hoisting yoke is connected to the hoisting cables of a lattice boom crane. Such a lifting crane uses a boom rotatable around a horizontal rotation axis, wherein the lifting crane itself can generally also be rotated around a vertical rotation axis provided by a crane base.

It has additional advantages for the method and the hoisting yoke to be utilized on a vessel, for which purpose the vessel is provided with the above-described lifting crane. The invention has the additional advantage that no or only relatively light messenger and auxiliary lines need be handled. This advantage is increasingly significant because elongate objects are becoming heavier and heavier, which has the consequence that the lifting material must also take an increasingly heavier form, whereby it can no longer be handled manually. According to the invention, it is possible that only relatively light messenger and auxiliary lines need be handled.

The embodiments of the invention described in this patent application can be combined in any possible combination of these embodiments, and each embodiment can individually form the subject-matter of a divisional patent application.

BRIEF DESCRIPTION OF THE DRAWINGS

The invention will now be further elucidated on the basis of the following figures, without otherwise being limited thereto. In the figures:

FIGS. 2-1-2-10 are schematic perspective views of different steps of an embodiment of a method in which the invented hoisting yoke is applied;

FIG. 3-1 is a schematic perspective cut-away view of an end part of a hoisting yoke according to an embodiment of the invention in a first situation;

FIG. 3-2 is a schematic perspective cut-away view of an end part of a hoisting yoke according to an embodiment of the invention in a second situation;

FIGS. 4-1-4-3 are schematic side views of a holding means according to an embodiment of the invention; and, finally FIGS. 5-1-5-3 are schematic front views of the holding means shown in FIG. 4 according to an embodiment of the invention.

DESCRIPTION OF THE INVENTION

Figure 1:
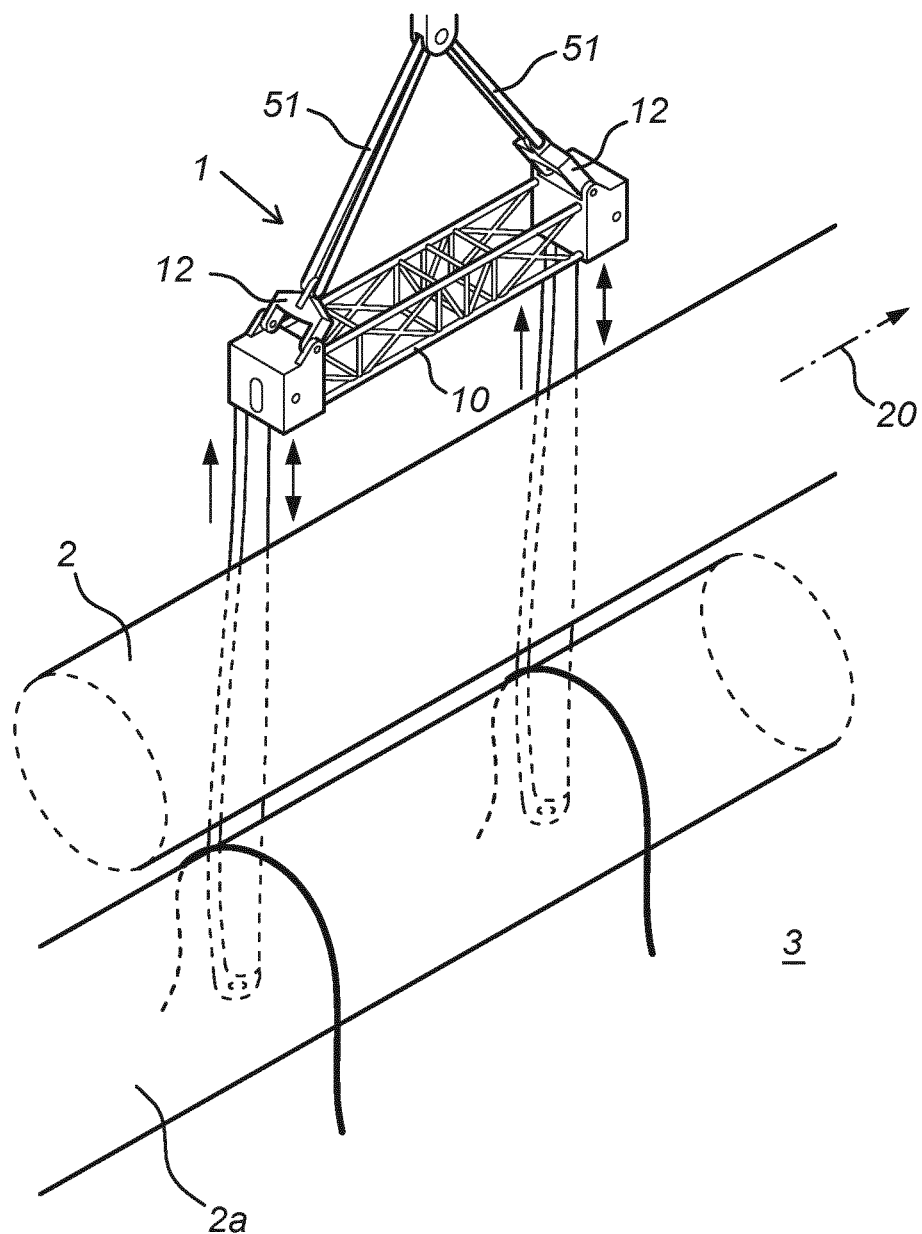
FIG. 1 is a schematic perspective view of a hoisting yoke, suspended from a lifting crane, according to an embodiment of the invention.

Referring to FIG. 1, a hoisting yoke 1 according to an embodiment of the invention is shown. Hoisting yoke 1 is configured to take up an elongate object such as a shown foundation pile 2. The foundation pile 2 to be taken up is situated together with other foundation piles 2 on the work deck 3 of a vessel (not further shown). Foundation piles 2 can for instance be situated in a rack suitable for this purpose, which comprises preformed supports 4 (as for instance shown in FIG. 2-10).

Figures 1, 2:
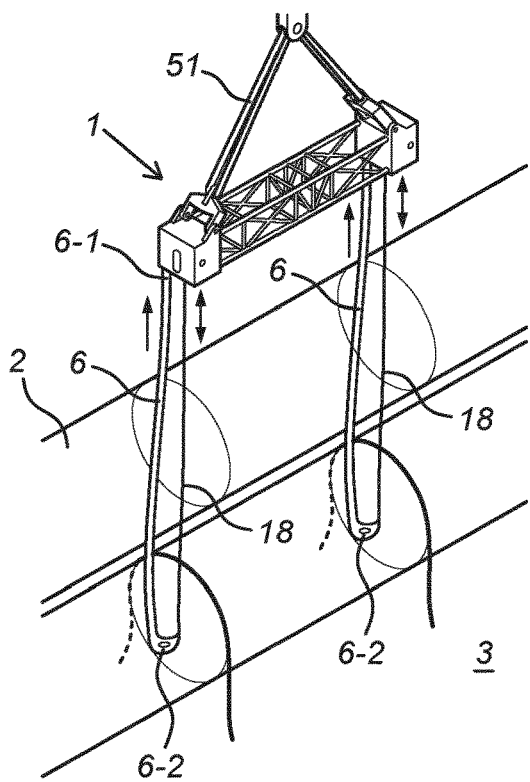
Figure 2:
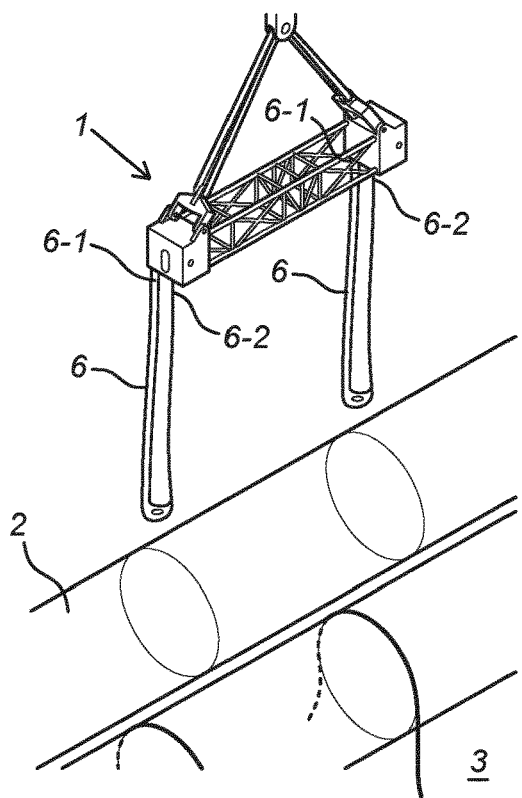

Hoisting yoke 1 comprises a beam-like support frame 10 which in the shown embodiment is embodied as a lattice structure. When taking up a foundation pile 2, support frame 10 is configured to extend in a longitudinal direction 20 of foundation pile 2. The hoisting yoke comprises two box-like end parts 11 which are structurally connected to support frame 10 and which are both provided on an upper side with a pivotable coupling piece 12. For the purpose of coupling to a lifting crane (not further shown), each coupling piece 12 is suspended with cables 51 from a hoisting hook 5, as shown in FIG. 2. Hoisting hook 5 is suspended with hoisting cables 50 from a boom of the lifting crane.

End parts 11 are each provided with a sling 6 for taking up a foundation pile 2, as shown in FIGS. 2-9 and 2-10. The invention according to the shown embodiment relates to the manner in which foundation pile 2 is suspended in slings 6. This necessitates less manual manipulation of components by personnel present on work deck 3. Manual manipulation of less heavy tugger lines and hoisting lines can thus suffice.

Figures 2, 3:
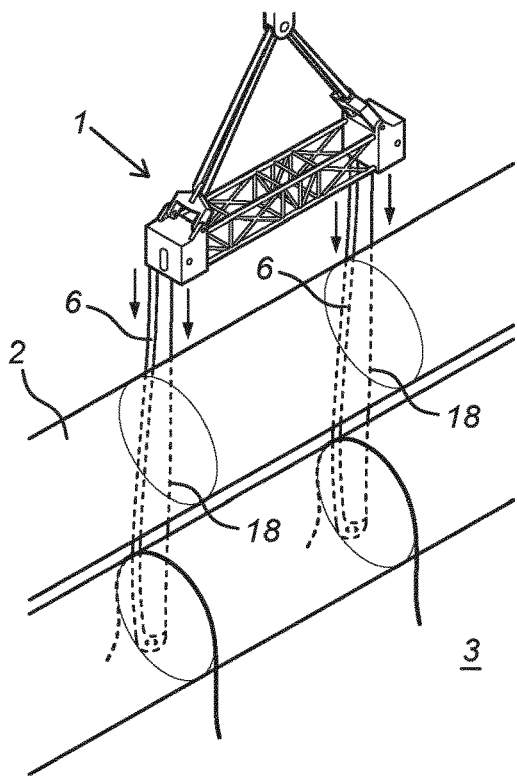

Referring to FIGS. 3-1 and 3-2, a hoisting yoke 1 according to an embodiment of the invention is shown, and more particularly the interior of a box-like end part 11 of hoisting yoke 1. The end part 11 of support frame 10 comprises a first holding means 13-1 for a first outer end 6-1 of a sling 6. The first holding means 13-1 is structurally connected to a side wall 11-1 of box-like end part 11 and comprises a cylindrical pin which extends from side wall 11-1 in the direction of the interior of end part 11 and around which the first outer end 6-1 of sling 6 can be trained. Outer end 6-1 can form a loop of a two-strand sling 6, but can also take the form of an eye. Structurally connected is understood to mean that the connection can transfer loads, in this case from first holding means 13-1 to (walls of) end part 11.

End part 11 further comprises a second holding means 13-2 for a second outer end 6-2 of sling 6. Second holding means 13-2 is likewise structurally connected to a part of box-like end part 11 and comprises a cylindrical pin 131 which extends in the direction of the interior of end part 11 and which is movable with a hydraulic cylinder 130 in the direction of a side wall 11-2 lying opposite side wall 11-1 between an open position, in which pin 131 lies removed from side wall 11-2, and a closed position in which pin 131 extends into an opening 11-3 arranged in side wall 11-2 (see FIG. 4-1).

End part 11 further comprises two messenger line winches (14-1, 14-2) configured to pay out two messenger lines (15-1, 15-2). The messenger lines (15-1, 15-2) are coupled to the second outer end 6-2 of the sling 6 hanging from the first holding means 13-1. As will be further elucidated below, this takes place such that when taking in the messenger lines (15-1, 15-2), said sling 6 is carried under foundation pile 2 and to the relevant end part 11 until the second outer end 6-2 of sling 6 is in a position in which second outer end 6-2 can be coupled to second holding means 13-2, thus forming one of the slings 6 for foundation pile 2. The messenger line winches (14-1, 14-2) are also structurally connected to (the side wall 11-1 of) box-like end part 11. In the shown embodiment the messenger lines (15-1, 15-2) further run over discs (16-1, 16-2) arranged against side wall 11-2 so as to be able to bring the messenger lines (15-1, 15-2) and a second outer end 6-1 of sling 6 coupled thereto into the vicinity of the second holding means 13-2.

End part 11 is also provided with an auxiliary line winch 17 which is configured to pay out an auxiliary line 18 from end part 11. In a step of the method auxiliary line 18 is also coupled to second outer end 6-2 of the sling 6 hanging from first holding means 13-1, as will be further elucidated below. Auxiliary line winch 17 is further structurally connected to (the side wall 11-2 of) the box-like end part 11. In the shown embodiment auxiliary line 18 runs over a disc 19, which is structurally connected to box-like end part 11, so as to be able to bring auxiliary line 18 into the vicinity of a second outer end 6-2 of sling 6 to be coupled thereto.

The messenger line winches (14-1, 14-2) and the auxiliary line winch 17 can optionally be (structurally) connected in releasable manner to a part of an end part 11 of hoisting yoke 1.

Hoisting yoke 1 is further provided with at least one drive, particularly a hydraulic and/or electric drive, for driving the messenger line winches (14-1, 14-2) and the auxiliary line winch 17, and also the hydraulic cylinder 130 of second holding means 13-2. This drive is preferably remotely controllable, for instance by an operator of the lifting crane or by other personnel.

Figures 2, 3, 4:
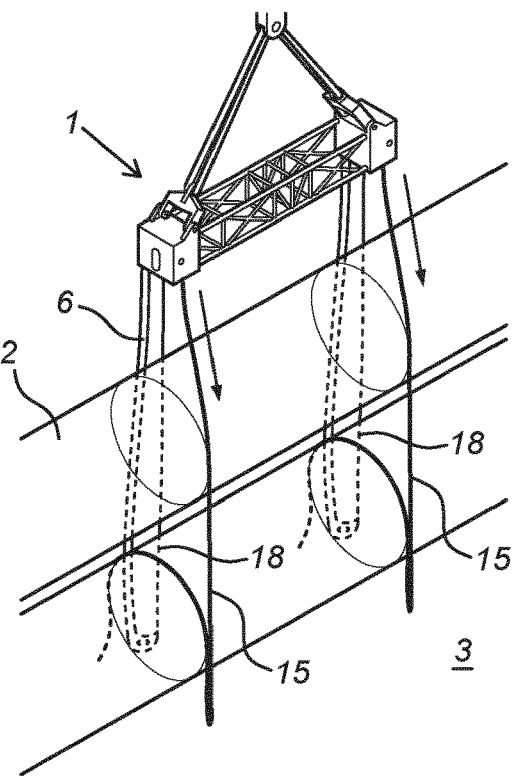
Figures 2, 3, 4, 5:
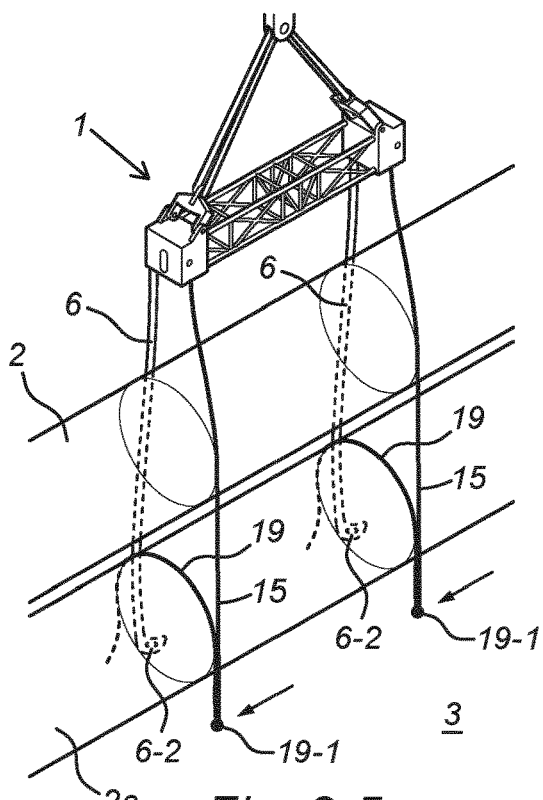
Figures 2, 3, 4, 5, 6:
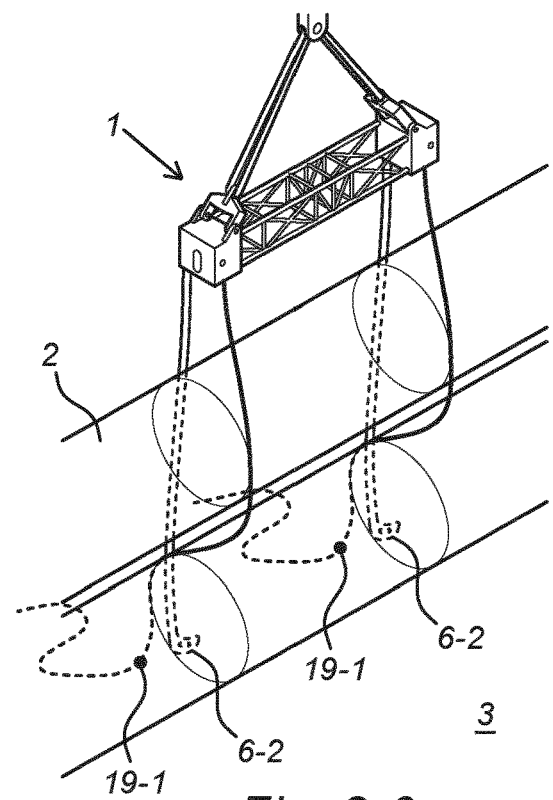
Figures 2, 3, 4, 5, 6, 7:
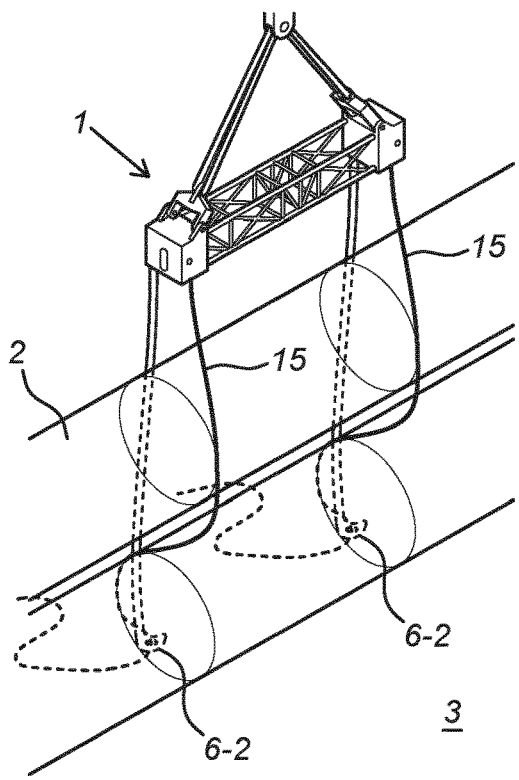
Figures 2, 3, 4, 5, 6, 7, 8:
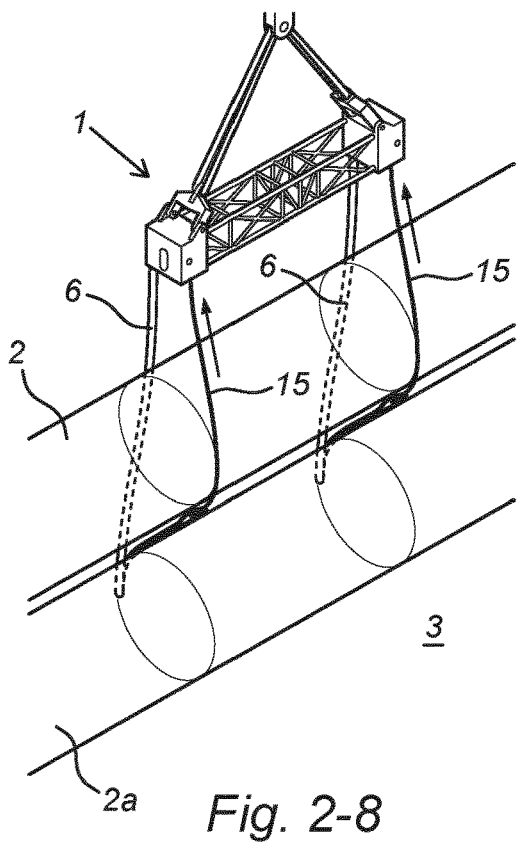
Figures 2, 3, 4, 5, 6, 7, 8, 9:
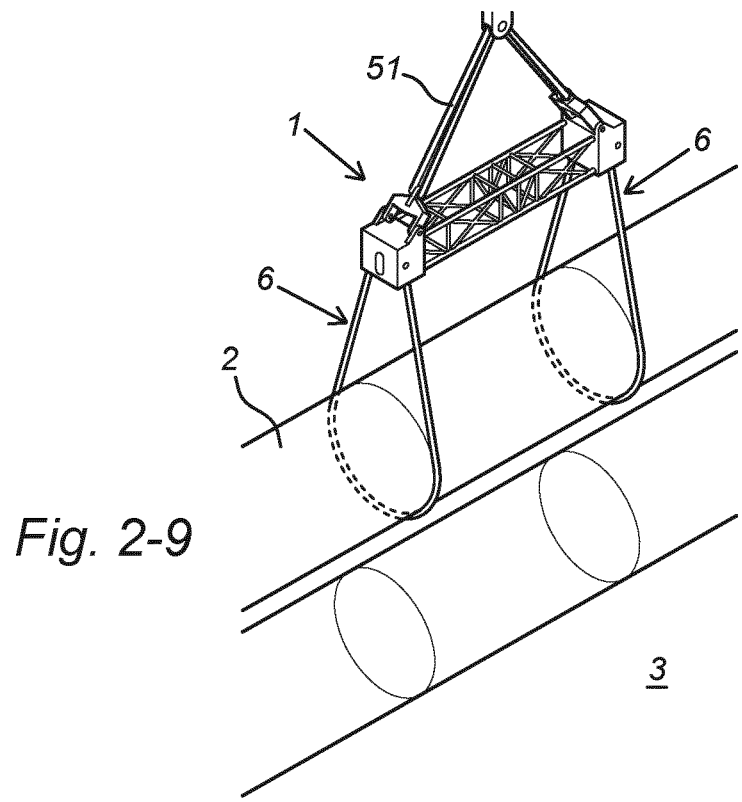
Figures 2, 3, 4, 5, 6, 7, 8, 9, 10:
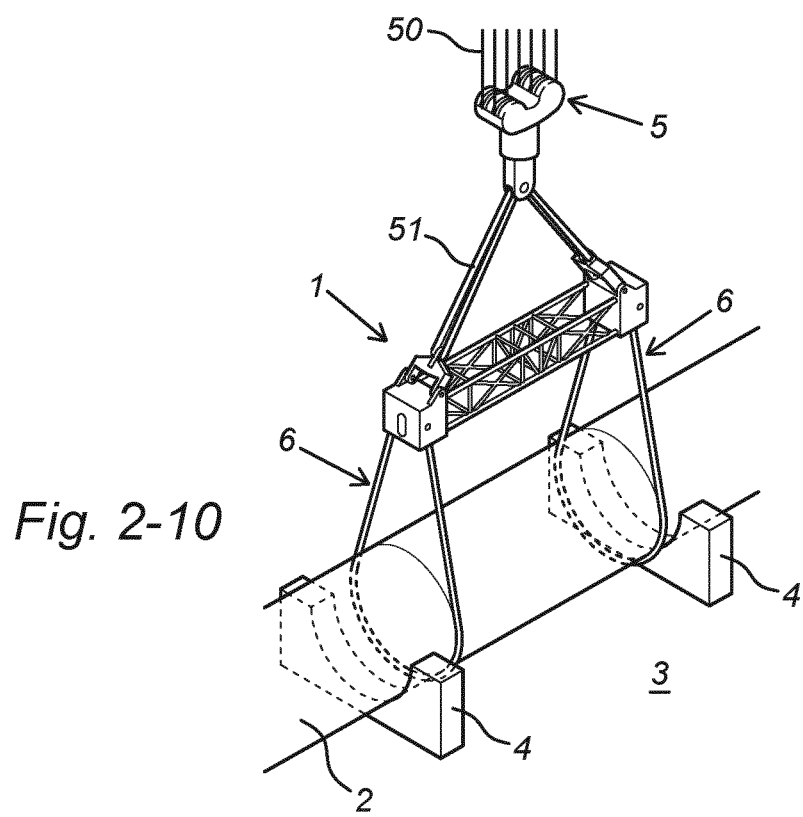
Figures 3, 5:
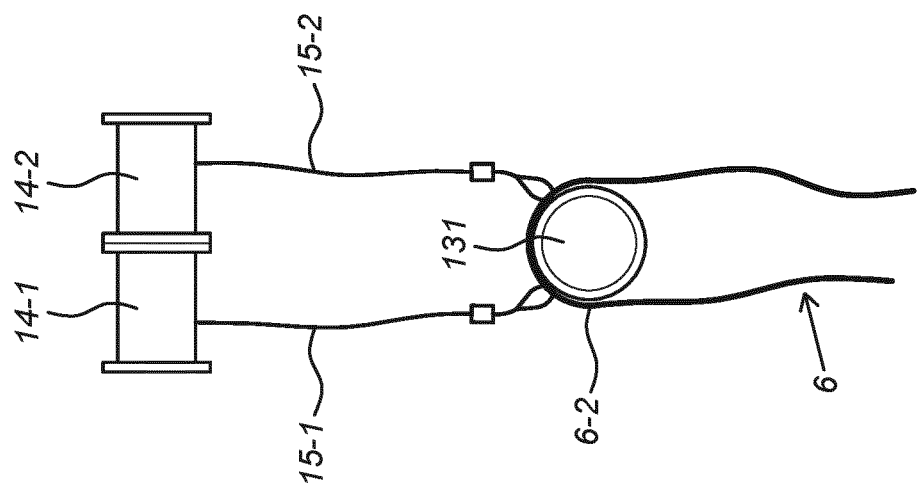
Figures 2, 5:
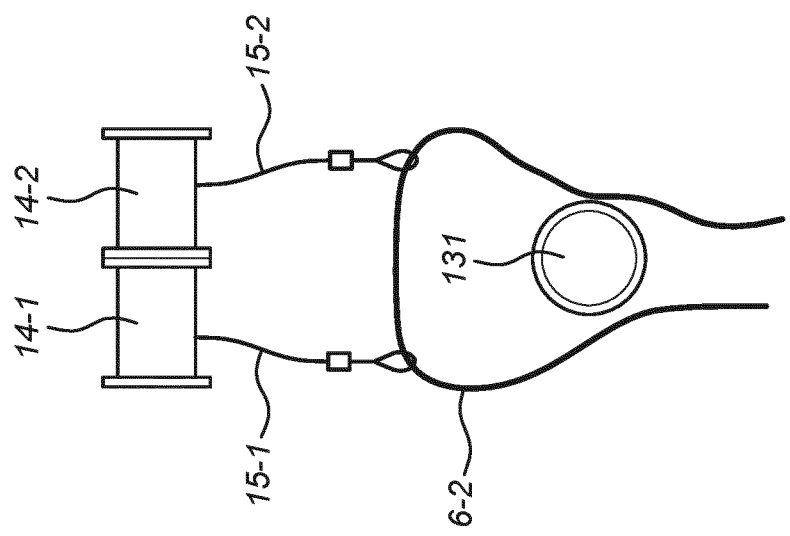
Figures 1, 5:
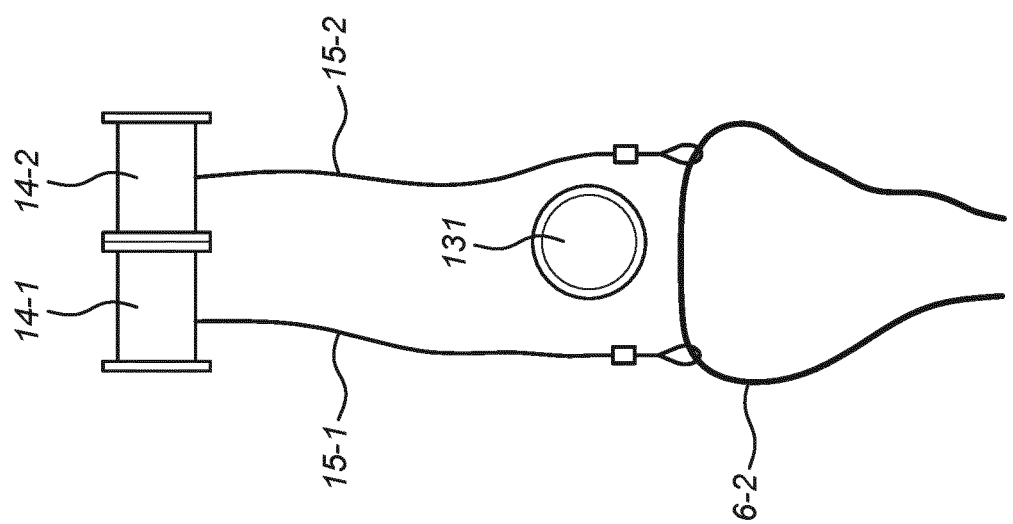

The manner of connecting the second outer end 6-2 of sling 6 to second holding means 13-2 is illustrated in FIGS. 4-1-4-3 and, from a front view, in FIGS. 5-1-5-3. In the open position (see FIGS. 4-1 and 5-1) the second outer end 6-2 of sling 6 can be moved past the pin 131 of second holding means 13-2 by pulling in the messenger lines (15-1, 15-2). Pin 131 is then slid toward side wall 11-2 under the influence of hydraulic cylinder 130 and brought into the closed position, as shown in FIGS. 4-2, 4-3, 5-2 and 5-3. In this closed position the loop-shaped second outer end 6-2 is in a position in which it lies above pin 131. By then paying out the messenger lines (15-1, 15-2) the loop-shaped second outer end 6-2 moves toward pin 131 until this outer end 6-2 has pulled itself around pin 131. In this way the second outer end 6-2 is coupled to the second holding means 13-2 and the sling 6 thus coupled to hoisting yoke 1 can carry a load, such as the foundation pile 2.

Referring to FIGS. 2-1-2-10, different steps are shown of a method according to an embodiment of the invention, wherein the above described hoisting yoke 1 is applied.

FIG. 2-1 shows a first step of a method for taking up an elongate foundation pile 2 from a work deck 3 of a vessel. For this purpose an embodiment of the above described hoisting yoke 1 is coupled to a lifting crane (not shown) situated on work deck 3. A foundation pile 2 situated on work deck 3 is taken up in a sling 6 by holding a first outer end 6-1 of sling 6 with a first holding means 13-1 provided at an end part 11 of support frame 10 of hoisting yoke 1, as was described above with reference to FIGS. 3-1 and 3-2. Sling 6 is hung from first holding means 13-1 so that sling 6 hangs down freely from holding means 13-1 to a position in the vicinity of foundation pile 2 or work deck 3 (FIGS. 1 and 2-1). In order to prevent sling 6, which hangs free at one end, from swinging an auxiliary line 18 can in an embodiment be payed out from end part 11 using auxiliary line winch 17 and be coupled to the second outer end 6-2 of the sling 6 hanging from first holding means 13-1 (FIG. 2-1). By then hauling in auxiliary line 18 using auxiliary line winch 17 second outer end 6-2 is pulled up against hoisting yoke 1, as can be seen in FIG. 2-2. This shortens the length of sling 6 so that it can be displaced with the lifting crane relative to work deck 3 more easily into the position, shown in FIG. 2-2, above a foundation pile 2 to be taken up.

In a subsequent step (FIG. 2-3) auxiliary line 18 is once again payed out, wherein the second outer end 6-2 of sling 6 is brought into the vicinity of the foundation pile 2 to be taken up, if desired onto work deck 3, by its own weight. Sling 6 with auxiliary line 18 coupled thereto is here situated on one side of the foundation pile 2 to be taken up. In a subsequent step (FIG. 2-4) one or more messenger lines 15 (15-1, 15-2) are payed out per outer end 11 using messenger line winch(es) 14 (14-1, 14-2), wherein a free outer end of the messenger lines 15 (15-1, 15-2) is situated in the vicinity of foundation pile 2. Messenger lines 15 (15-1, 15-2) here hang on a different side of foundation pile 2 than the coupled sling 6 and auxiliary line 18. The second outer end 6-2 of the sling is then uncoupled from auxiliary line 18 and the auxiliary line is hauled in using auxiliary line winch 17 (FIG. 2-5).

In a subsequent step the messenger lines 15 (15-1, 15-2) are fed under the foundation pile 2 to be taken up. This can for instance be done by coupling a free outer end of messenger lines 15 (15-1, 15-2) to an outer end 19-1 of a connecting line 19 provided under the foundation pile 2 to be taken up. This connecting line 19 can for instance be arranged over another foundation pile 2a which is situated under the foundation pile 2 to be taken up, as shown in FIG. 2-5.

In a subsequent step, shown in FIG. 2-6, connecting line 19 is run over foundation pile 2a and under the foundation pile 2 to be taken up. Connecting line 19 hereby moves the free outer end of messenger lines 15 (15-1, 15-2) under foundation pile 2 and to that side of the foundation pile 2 were the second outer end 6-2 of sling 6 is also situated.

The messenger lines 15 (15-1, 15-2) are then coupled to the second outer end 6-2 of the sling 6 which is still hanging from first holding means 13-1 (FIG. 2-7).

By now taking in messenger lines 15 (15-1, 15-2) using messenger line winches 14 (14-1, 14-2) sling 6 is carried under foundation pile 2 and to the relevant end part 11, as shown in FIG. 2-8, until the second outer end 6-2 of sling 6 can be coupled to second holding means 13-2, as was elucidated above with reference to FIGS. 4-1-4-3 and 5-1-5-3.

It will be apparent that the above described method steps are preferably performed at both end parts 11 of support frame 10 of hoisting yoke 1, and are preferably also performed simultaneously at both end parts 11.

The thus formed slings 6 are now able to take up foundation pile 2 with both end parts 11 of hoisting yoke 1 and displace them as shown in FIGS. 2-9 and 2-10.

It will be apparent that the above described embodiments of the hoisting yoke have to be provided with peripheral equipment such as for instance hydraulic and electrical power sources, feed conduits therefor and the like. This peripheral equipment is not described in further detail.

The invention claimed is:

1. A method for taking up an elongate object from a ground surface using a hoisting yoke coupled to a lifting means, wherein a support frame of the hoisting yoke extends in a longitudinal direction of the object and wherein slings provided at end parts of the support frame take up the object, said method comprising the steps of:
   a) holding a first outer end of a sling by a first holding means provided at an end part of the support frame and letting a second outer end of the sling hang down from the first holding means at a position in the vicinity of the object,
   b) paying out a messenger line from the end part using a messenger line winch, feeding the messenger line under the object and coupling the messenger line to the second outer end of the sling hanging from the first holding means,
   c) taking in the messenger line so that the sling is carried under the object and to the relevant end part, and
   d) coupling the second outer end of the sling to a second holding means provided at the end part, thus forming one of the slings for the object,
   wherein the sling is lowered on one side of the object in step a) and the messenger line is lowered on another side of the object in step b),
   wherein the messenger line is fed under the object in step b) by coupling a free outer end of the messenger line to an outer end of a connecting line provided under the object and running the connecting line under the object, the connecting line thereby moving the free outer end of the messenger line under the object to said one side of the object where the second outer end of the sling is situated, and
   wherein another outer end of the connecting line is coupled to the second outer end of the sling hanging from the first holding means.

2. The method according to claim 1, wherein steps a)-d) are performed at both end parts of the support frame.

3. The method according to claim 2, wherein steps a)-d) are performed simultaneously at both end parts of the support frame.

4. The method according to claim 1, wherein an auxiliary line is payed out from the end part using an auxiliary line winch and, prior to step a), is coupled to the second outer end of the sling hanging from the first holding means, step a) is performed, and the auxiliary line is uncoupled from the second outer end prior to step b).

5. The method according to claim 1, wherein the ground surface comprises a work deck of a vessel.

6. The method according to claim 1, wherein the elongate object comprises a wind turbine or components thereof, or a foundation pile for a wind turbine.

* * * * *